US012682771B2

(12) United States Patent
Shoeb et al.

(10) Patent No.: US 12,682,771 B2
(45) Date of Patent: Jul. 14, 2026

(54) CORRECTING ERRONEOUS UAV POSITIONING INFORMATION USING SEMANTICALLY SEGMENTED IMAGES

(71) Applicant: WING AVIATION LLC, Mountain View, CA (US)

(72) Inventors: Ali Shoeb, San Rafael, CA (US); Damien Jourdan, San Jose, CA (US); Jeremie Gabor, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 273 days.

(21) Appl. No.: 18/341,660

(22) Filed: Jun. 26, 2023

(65) Prior Publication Data

US 2024/0428696 A1 Dec. 26, 2024

(51) Int. Cl.
| | |
|---|---|
| *G08G 5/55* | (2025.01) |
| *B64U 10/20* | (2023.01) |
| *G06V 10/764* | (2022.01) |
| *G06V 20/17* | (2022.01) |
| *G08G 5/57* | (2025.01) |

(52) U.S. Cl.
CPC .............. *G08G 5/55* (2025.01); *B64U 10/20* (2023.01); *G06V 10/764* (2022.01); *G06V 20/17* (2022.01); *G08G 5/57* (2025.01); *B64U 2201/10* (2023.01)

(58) Field of Classification Search
CPC .. G08G 5/55; G08G 5/57; G08G 5/54; G06V 10/764; G06V 20/17; G01C 21/30
See application file for complete search history.

(56) References Cited

U.S. PATENT DOCUMENTS

| | | | |
|---|---|---|---|
| 9,689,686 | B1 | 6/2017 | Carmack et al. |
| 9,725,171 | B1 * | 8/2017 | Carmack .................. G05D 3/00 |
| 2017/0291704 | A1 * | 10/2017 | Alegria ..................... G08G 5/55 |
| 2020/0324898 | A1 * | 10/2020 | Youmans ............. G06V 20/176 |
| 2023/0316741 | A1 | 10/2023 | Shoeb |

FOREIGN PATENT DOCUMENTS

DE 20 2022 105 718 U1 3/2023

OTHER PUBLICATIONS

International Search Report and Written Opinion, mailed Apr. 30, 2024, in corresponding International Patent Application No. PCT/US2023/082478, 16 pages.

(Continued)

*Primary Examiner* — Roy Rhee
(74) *Attorney, Agent, or Firm* — Christensen O'Connor Johnson Kindness PLLC

(57) ABSTRACT

In some embodiments, a method for autonomous navigation of an unmanned aerial vehicle (UAV) is provided. The UAV determines a tracked position using at least one positioning sensor of the UAV. The UAV captures an image using a camera of the UAV. The UAV determines a visual position confidence area using the captured image. The UAV checks the tracked position using the visual position confidence area to determine whether the tracked position is accurate. In response to determining that the tracked position is not accurate, the UAV causes a corrective action based on the visual position confidence area to be taken.

12 Claims, 12 Drawing Sheets

(56) References Cited

OTHER PUBLICATIONS

Simas et al., 'Earth-based Simultaneous Localization and Mapping for Drones in Dynamic Environments', Journal of Intelligent & Robotics Systems, Springer, vol. 104, No. 4, Published online Mar. 18, 2022, 16 pages.

Chen et al., 'CEB-Map: Visual Localization Error Prediction for Safe Navigation', IEEE Sensors Journal, IEEE USA, vol. 21, No. 10, May 15, 2021, pp. 11769-11780.

Edgar Sepp, 'Creating High-Definition Vector Maps for Autonomous Driving', Master's Thesis at University of Tartu, Mar. 1, 2021, 84 pages.

* cited by examiner

314

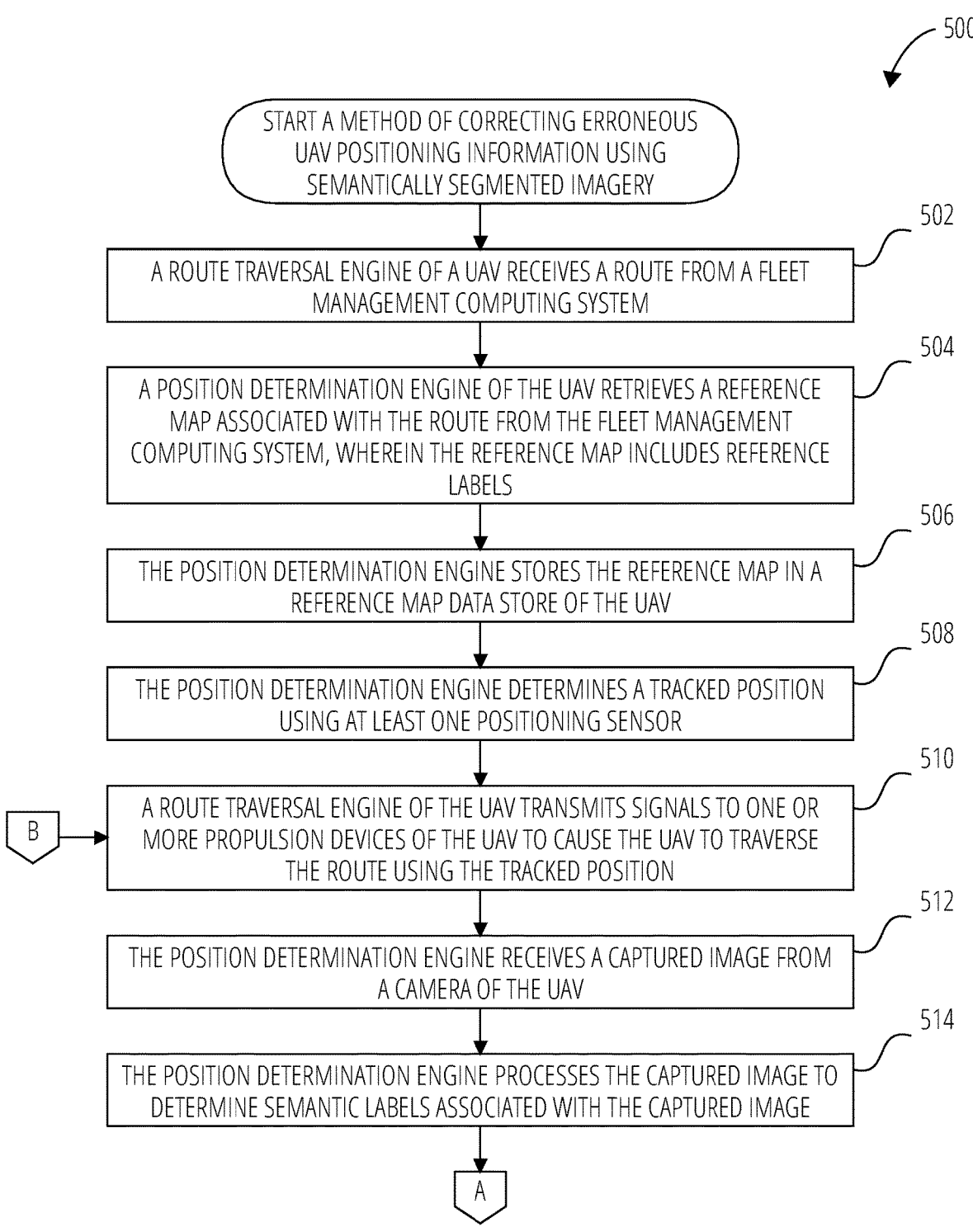

500

START A METHOD OF CORRECTING ERRONEOUS
UAV POSITIONING INFORMATION USING
SEMANTICALLY SEGMENTED IMAGERY

502

A ROUTE TRAVERSAL ENGINE OF A UAV RECEIVES A ROUTE FROM A FLEET
MANAGEMENT COMPUTING SYSTEM

504

A POSITION DETERMINATION ENGINE OF THE UAV RETRIEVES A REFERENCE
MAP ASSOCIATED WITH THE ROUTE FROM THE FLEET MANAGEMENT
COMPUTING SYSTEM, WHEREIN THE REFERENCE MAP INCLUDES REFERENCE
LABELS

506

THE POSITION DETERMINATION ENGINE STORES THE REFERENCE MAP IN A
REFERENCE MAP DATA STORE OF THE UAV

508

THE POSITION DETERMINATION ENGINE DETERMINES A TRACKED POSITION
USING AT LEAST ONE POSITIONING SENSOR

510

B

A ROUTE TRAVERSAL ENGINE OF THE UAV TRANSMITS SIGNALS TO ONE OR
MORE PROPULSION DEVICES OF THE UAV TO CAUSE THE UAV TO TRAVERSE
THE ROUTE USING THE TRACKED POSITION

512

THE POSITION DETERMINATION ENGINE RECEIVES A CAPTURED IMAGE FROM
A CAMERA OF THE UAV

514

THE POSITION DETERMINATION ENGINE PROCESSES THE CAPTURED IMAGE TO
DETERMINE SEMANTIC LABELS ASSOCIATED WITH THE CAPTURED IMAGE

CORRECTING ERRONEOUS UAV POSITIONING INFORMATION USING SEMANTICALLY SEGMENTED IMAGES

TECHNICAL FIELD

This disclosure relates generally to unmanned aerial vehicles (UAVs), and in particular but not exclusively, relates to controlling UAVs based on imagery.

BACKGROUND

Typically, UAVs are able to autonomously navigate using a variety of positioning modalities. One such modality is a global satellite navigation system (GNSS), such as the Global Positioning System (GPS), where signals received from satellites are processed in order to determine a position of the UAV. Another such modality is an inertial navigation system, where accelerometers and/or other sensors are used to measure distances traveled by the UAV from a known starting point. Yet another such modality is visual navigation, in which images captured by cameras mounted to the UAV are compared to reference images in order to determine a position of the UAV.

One problem with autonomous positioning and navigation is that, even if multiple position sensing modalities are used, it can be difficult to know when a tracked position generated using one or more sensing modalities is reliable. For example, positions determined using GNSS may be subject to interference from terrain, weather, and/or other factors. As another example, small errors in position updates determined by inertial navigation may compound over the course of a long route. Autonomous navigation using incorrect tracked positions can lead to inefficient or incorrect routes being taken, or, in the worst case, can lead to the UAV operating in unsafe conditions.

What is desired are techniques that can determine when a tracked position is unreliable, and that can correct the tracked position when possible or take other action when correction is not possible.

BRIEF SUMMARY

In some embodiments, a non-transitory computer-readable medium having logic stored thereon is provided. The logic, in response to execution by one or more processors of an unmanned aerial vehicle (UAV), causes the UAV to perform actions comprising: determining, by the UAV, a tracked position using at least one positioning sensor of the UAV; capturing, by the UAV, an image using a camera of the UAV; determining, by the UAV, a visual position confidence area using the captured image; checking the tracked position using the visual position confidence area to determine whether the tracked position is accurate; and in response to determining that the tracked position is not accurate, causing, by the UAV, a corrective action based on the visual position confidence area.

In some embodiments, a method for autonomous navigation of an unmanned aerial vehicle (UAV) is provided. The UAV determines a tracked position using at least one positioning sensor of the UAV. The UAV captures an image using a camera of the UAV. The UAV determines a visual position confidence area using the captured image. The UAV checks the tracked position using the visual position confidence area to determine whether the tracked position is accurate. In response to determining that the tracked position is not accurate, the UAV causes a corrective action based on the visual position confidence area to be taken.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 5A-FIG. 5B are a flowchart that illustrates a non-limiting example embodiment of a method of correcting erroneous UAV positioning information using semantically segmented imagery according to various aspects of the present disclosure.

DETAILED DESCRIPTION

In some embodiments of the present disclosure, a UAV determines a visual position confidence area based on a comparison of features of a captured image to features of a reference map. The visual position confidence area is an area within which the UAV has determined to a high level of confidence that the UAV is located. If a tracked position determined via GNSS (or other positioning modality) is within the visual position confidence area, the tracked position is considered confirmed as being accurate. If the tracked position is outside of the visual position confidence area, then the tracked position may be corrected if the visual position confidence area indicates a position with an acceptable amount of precision, or other corrective action may be taken to ensure safe operation if the visual position confidence area indicates a position with less than the acceptable amount of precision.

Figure 1A:
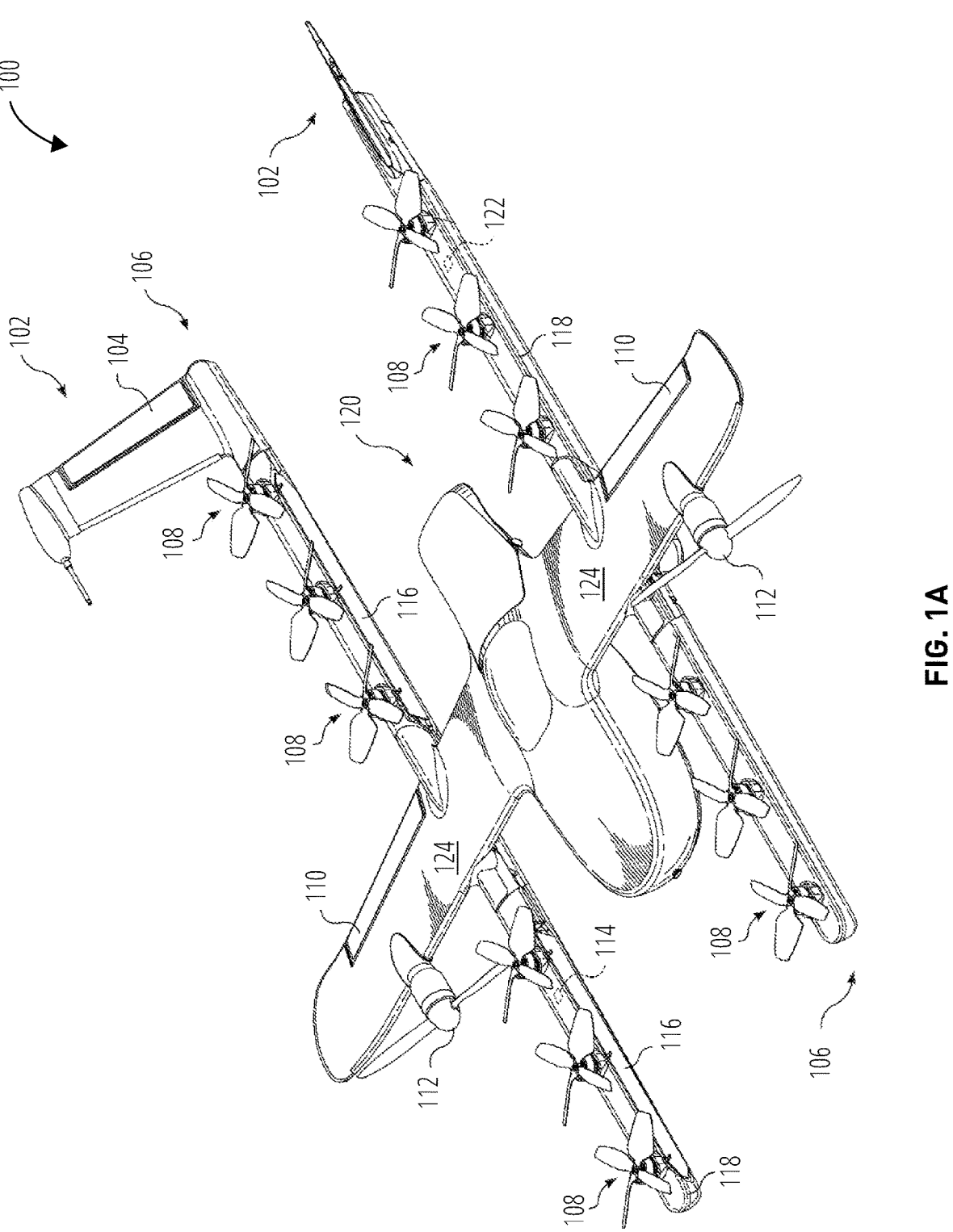
FIG. 1A and FIG. 1B illustrate an aerial vehicle or UAV, in accordance with various embodiments of the present disclosure.
Figure 1B:
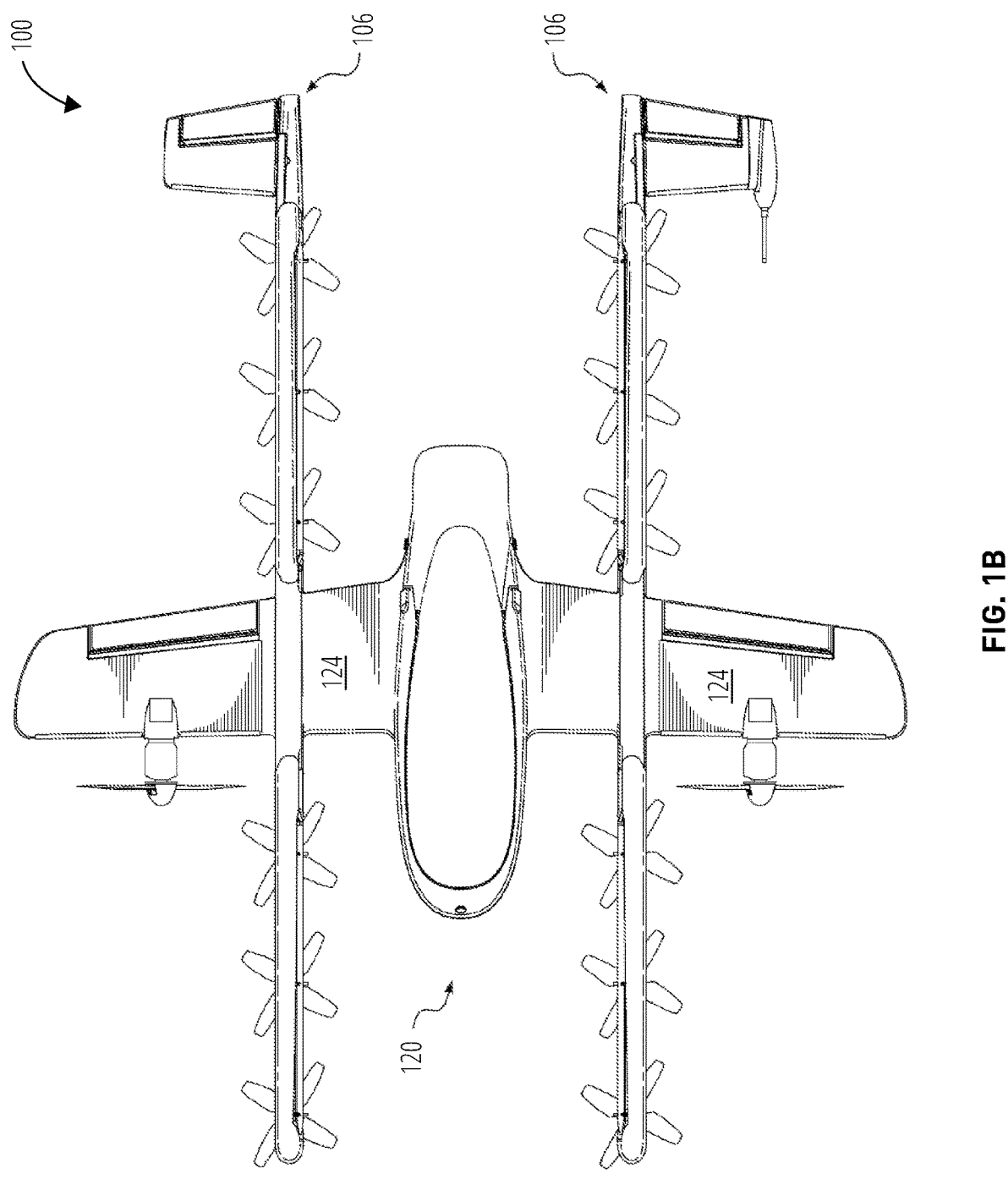

FIG. 1A and FIG. 1B illustrate an aerial vehicle or UAV 100, in accordance with an embodiment of the present disclosure. The illustrated embodiment of UAV 100 is a vertical takeoff and landing (VTOL) unmanned aerial vehicle (UAV) that includes separate propulsion units 112 and propulsion units 108 for providing horizontal and vertical propulsion, respectively. UAV 100 is a fixed-wing aerial vehicle, which as the name implies, has a wing assembly 124 that can generate lift based on the wing shape and the vehicle's forward airspeed when propelled horizontally by propulsion units 112. FIG. 1A is a perspective top view illustration of UAV 100 while FIG. 1B is a bottom side plan view illustration of UAV 100.

The illustrated embodiment of UAV 100 includes a fuselage 120. In one embodiment, fuselage 120 is modular and includes a battery module, an avionics module, and a mission payload module. These modules are detachable from each other and mechanically securable to each other to contiguously form at least a portion of the fuselage 120 or UAV main body.

Figure 2:
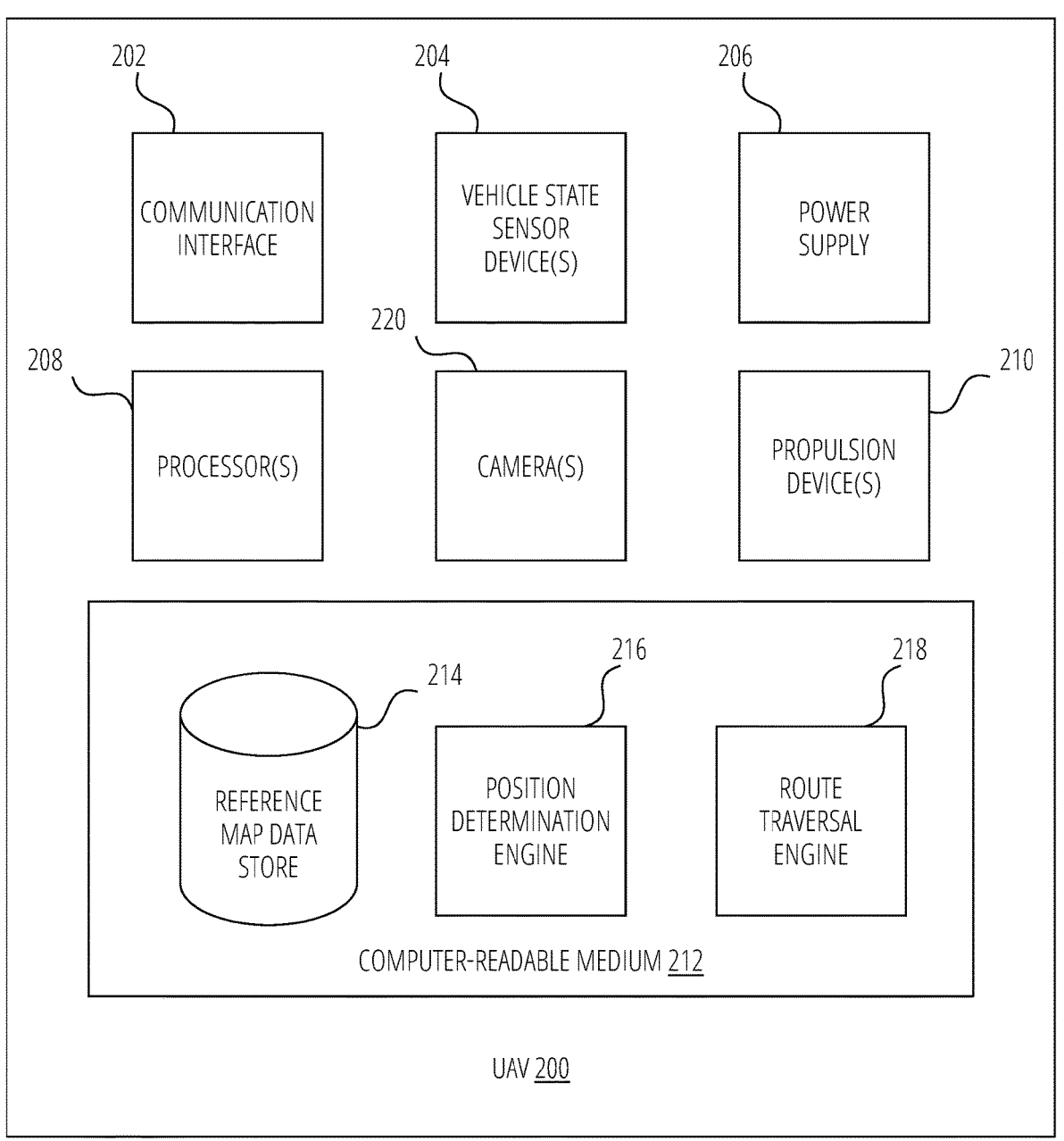
FIG. 2 is a block diagram that illustrates additional components of a non-limiting example embodiment of a UAV according to various aspects of the present disclosure.

The battery module includes a cavity for housing one or more batteries for powering UAV 100. The avionics module houses flight control circuitry of UAV 100, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Other components that may be carried by some embodiments of the UAV 100 are illustrated in FIG. 2.

The illustrated embodiment of UAV 100 further includes horizontal propulsion units 112 positioned on wing assembly 124, which can each include a motor, shaft, motor mount, and propeller, for propelling UAV 100. The illustrated embodiment of UAV 100 includes two boom assemblies 106 that secure to wing assembly 124.

The illustrated embodiments of boom assemblies 106 each include a boom housing 118 in which a boom is disposed, vertical propulsion units 108, printed circuit boards 116, and stabilizers 102. Vertical propulsion units 108 can each include a motor, shaft, motor mounts, and propeller, for providing vertical propulsion. Vertical propulsion units 108 may be used during a hover mode where UAV 100 is descending (e.g., to a delivery location) or ascending (e.g., following a delivery). Stabilizers 102 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 102 may include one or more rudders 104 for controlling the UAV's yaw, and wing assembly 124 may include elevators for controlling the UAV's pitch and/or ailerons 110 for controlling the UAV's roll. As another example, increasing or decreasing the speed of all the propellers simultaneously can result in UAV 100 increasing or decreasing its altitude, respectively. The UAV 100 may also include components for sensing the environment around the UAV 100, including but not limited to audio sensor 122 and audio sensor 114. Further examples of sensor devices are illustrated in FIG. 2 and described below.

Many variations on the illustrated fixed-wing aerial vehicle are possible. For instance, aerial vehicles with more wings (e.g., an "x-wing" configuration with four wings), are also possible. Although FIG. 1A and FIG. 1B illustrate one wing assembly 124, two boom assemblies 106, two horizontal propulsion units 112, and six vertical propulsion units 108 per boom assembly 106, it should be appreciated that other variants of UAV 100 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 2 is a block diagram that illustrates a non-limiting example embodiment of a UAV according to various aspects of the present disclosure. The illustrated UAV 200 is configured to use positions determined from captured images to verify and adjust tracked positions determined using other positioning modalities. In some embodiments, the UAV 200 is an aircraft such as the UAV 100 illustrated in FIG. 1A and FIG. 1B.

As shown, the UAV 200 includes a communication interface 202, one or more vehicle state sensor devices 204, a power supply 206, one or more processors 208, one or more propulsion devices 210, and a computer-readable medium 212.

In some embodiments, the communication interface 202 includes hardware and software to enable any suitable communication technology for communicating with other devices, including but not limited to other UAVs and/or a fleet management computing system. In some embodiments, the communication interface 202 includes multiple communication interfaces, each for use in appropriate circumstances. For example, the communication interface 202 may include a long-range wireless interface such as a 4G or LTE interface, or any other type of long-range wireless interface (e.g., 2G, 3G, 5G, or WiMAX), to be used to communicate with other devices while traversing a route. The communication interface 202 may also include a medium-range wireless interface such as a Wi-Fi interface to be used when the UAV 200 is at an area near a start location or an endpoint where Wi-Fi coverage is available. The communication interface 202 may also include a short-range wireless interface such as a Bluetooth interface to be used when the UAV 200 is in a maintenance location or is otherwise stationary and waiting to be assigned a route. The communication interface 202 may also include a wired interface, such as an Ethernet interface or a USB interface, which may also be used when the UAV 200 is in a maintenance location or is otherwise stationary and waiting to be assigned a route.

In some embodiments, the vehicle state sensor devices 204 are configured to detect states of various components of the UAV 200, and to transmit signals representing those states to other components of the UAV 200. Some non-limiting examples of vehicle state sensor device 204 include a battery state sensor and a propulsion device health sensor. The vehicle state sensor devices 204 may also include a GNSS sensor, one or more accelerometers (and/or other devices that are part of an inertial navigation system), LIDAR devices, and/or other sensor devices for sensing an environment of the UAV 200.

In some embodiments, the power supply 206 may be any suitable device or system for storing and/or generating power. Some non-limiting examples of a power supply 206 include one or more batteries, one or more solar panels, a fuel tank, and combinations thereof. In some embodiments, the propulsion devices 210 may include any suitable devices for causing the UAV 200 to travel along the path. For an aircraft, the propulsion device 210 may include devices such as, but not limited to, one or more motors, one or more propellers, and one or more flight control surfaces.

In some embodiments, the processor 208 may include any type of computer processor capable of receiving signals from other components of the UAV 200 and executing instructions stored on the computer-readable medium 212. In some embodiments, the computer-readable medium 212 may include one or more devices capable of storing information for access by the processor 208. In some embodiments, the computer-readable medium 212 may include one or more of a hard drive, a flash drive, an EEPROM, and combinations thereof.

In some embodiments, the one or more cameras 220 may include any suitable type of camera for capturing imagery from the point of view of the UAV 200. For example, the cameras 220 may include one or more of a downward-facing camera or an angled-view camera. In some embodiments, the one or more cameras 220 may include one or more cameras of any type, including but not limited to a visible light camera, an infrared camera, a light-field camera, a laser camera, and a time-of-flight camera.

As shown, the computer-readable medium 212 has stored thereon a reference map data store 214, a position determination engine 216, and a route traversal engine 218. In some embodiments, the position determination engine 216 is configured to use signals from other devices, such as GPS sensor devices, vision-based navigation devices, accelerometers, LIDAR devices, and/or other devices that are not illustrated or described further herein, to assist in determining positions. In some embodiments, the route traversal engine 218 is configured to cause the propulsion device 210 to propel the UAV 200 through a route received from a fleet management computing system. The route traversal engine 218 may use the positions generated by the position determination engine 216 in navigating the route.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3A:
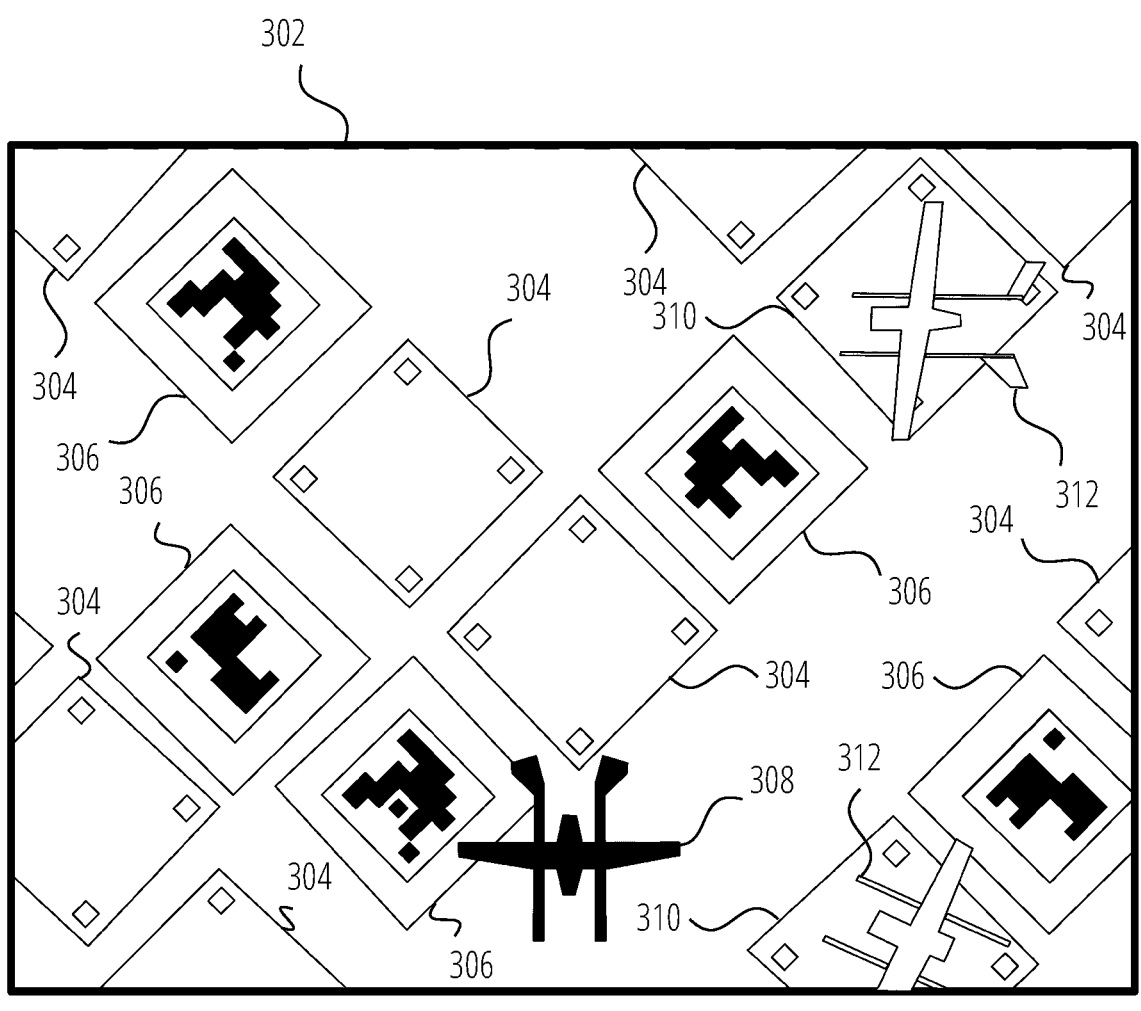
FIG. 3A illustrates a non-limiting example of an aerial image of a nest according to various aspects of the present disclosure.

FIG. 3A illustrates a non-limiting example of an aerial image of a nest according to various aspects of the present disclosure. The aerial image 302 is an example of captured image that may be captured shortly after the UAV 200 takes off from a nest, and shows several typical features that may be present in an aerial image of a nest.

As shown, the aerial image 302 includes a plurality of landing spaces, including a plurality of unoccupied landing spaces 304 and a plurality of occupied landing spaces 310 that have UAVs 312 present thereon. Though called a "landing space," the landing spaces are suitable locations for landing a UAV or for positioning a UAV prior to takeoff. In some embodiments, a landing space may be a marked area on the ground of the nest. In some embodiments, a landing space may be an object on which a UAV may land. For example, one non-limiting example of a type of landing space is a charging pad which can be used to inductively charge a UAV that has been positioned thereon.

The aerial image 302 also shows other features that may be visible, including a plurality of geofiducials 306 and a shadow 308 of a UAV. In some embodiments, geofiducials 306 may be installed at the nest and surveying techniques may be used to obtain precise geographic positions for the geofiducials 306 so that they may be used for visual positioning. That said, the installation and surveying of geofiducials 306 can be costly and time-consuming, and so the enabling of visual positioning that does not utilize geofiducials 306 is desirable.

Figure 3B:
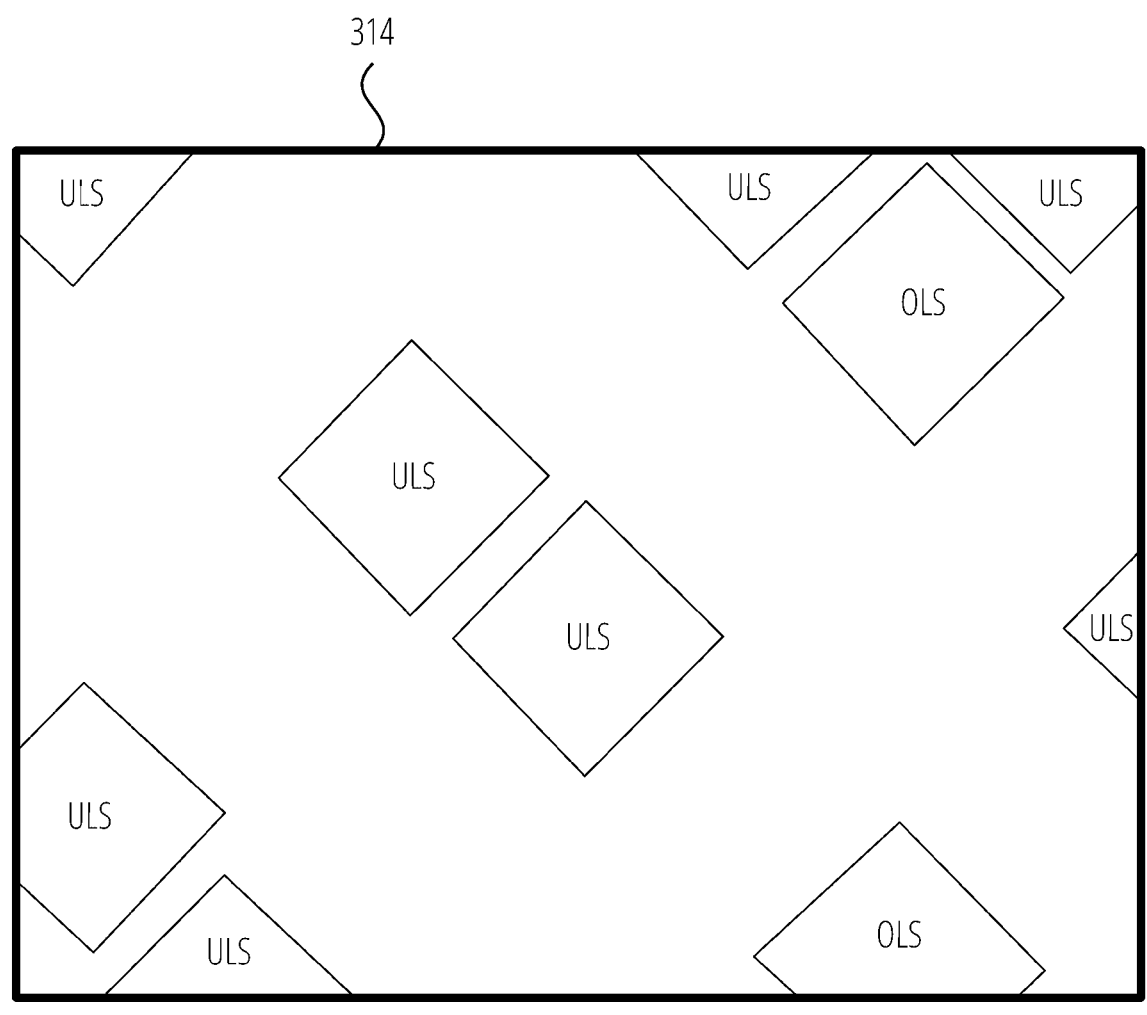
FIG. 3B illustrates a non-limiting example of semantic labels applied to the aerial image of FIG. 3A according to various aspects of the present disclosure.

FIG. 3B illustrates a non-limiting example of semantic labels applied to the aerial image of FIG. 3A according to various aspects of the present disclosure. As shown, semantic labels 314 have been applied to the unoccupied landing spaces (ULS semantic labels) and the occupied landing spaces (OLS semantic labels). The semantic labels 314 may be output by a process that classifies each pixel of the aerial image 302 and then uses various morphological operations and/or heuristics to detect areas to which various semantic labels should be applied, by a process that uses a classifier to directly identify objects within the aerial image 302, or by any other suitable process. Though semantic labels for landing spaces are shown and described above, one should recognize that other types of semantic labels may be generated and applied, including but not limited to semantic labels for streets, buildings, landing spaces, telephone poles, light standards, sporting fields, and/or bodies of water.

Figure 4:
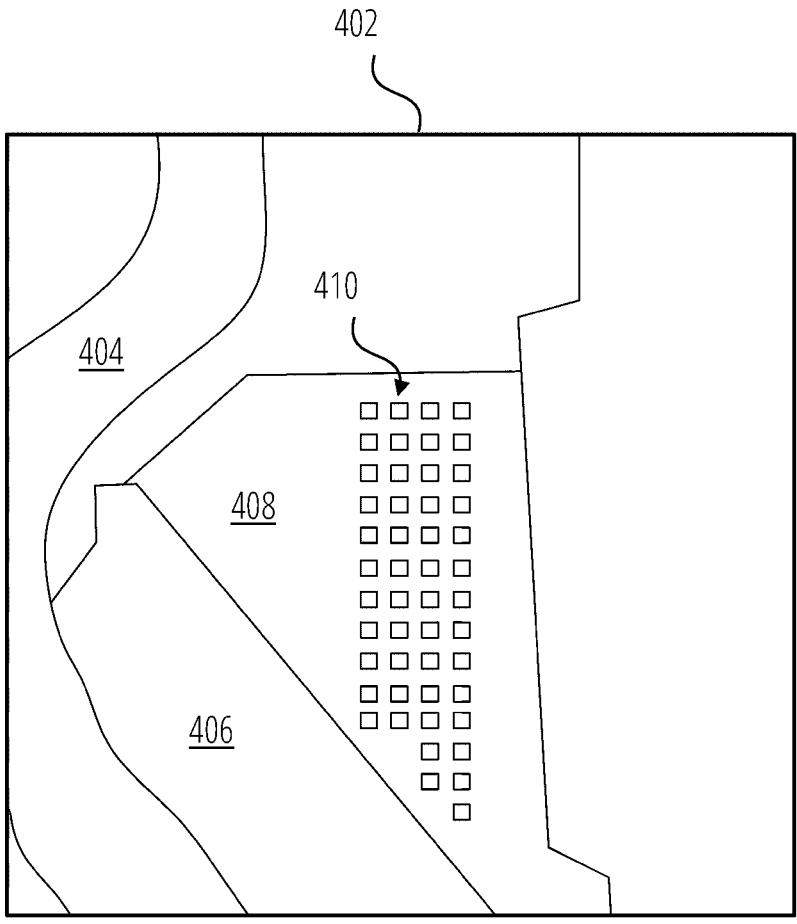
FIG. 4 illustrates a non-limiting example embodiment of a reference map for a region that includes a nest, according to various aspects of the present disclosure.

Once semantic labels are generated for an aerial image, the semantic labels can be aligned to reference labels in a reference map to determine a position for the camera, and thereby the UAV, that captured the aerial image. FIG. 4 illustrates a non-limiting example embodiment of a reference map for a region that includes a nest, according to various aspects of the present disclosure. In the reference map 402, reference labels have been applied to a body of water 404, a parking lot 406, a building 408, and landing spaces of a plurality of landing spaces 410. In some embodiments, the reference map 402 may include one or more aerial images that correspond to the reference labels, while in other embodiments, the reference map 402 may be limited to the reference labels themselves in order to conserve storage space.

In some embodiments, the reference labels may be manually applied to the reference map via a user interface. In some embodiments, machine learning techniques may be used, including but not limited to classifiers such as convolutional neural networks, to identify objects depicted in the reference map and automatically generate the reference labels. In some embodiments, data from one or more other sources, including but not limited to road map data, zoning data, and/or topographical data, may be used to automatically generate the reference labels for the reference map.

The geographic location of the reference map is known, and so, by extension, the geographic locations of the depicted objects (and the reference labels applied thereto) are also known. Accordingly, by aligning semantic labels of a captured image to the reference labels of the reference map, a geographic location for the captured image (and a precise position of the UAV) may be determined.

Figure 5B:
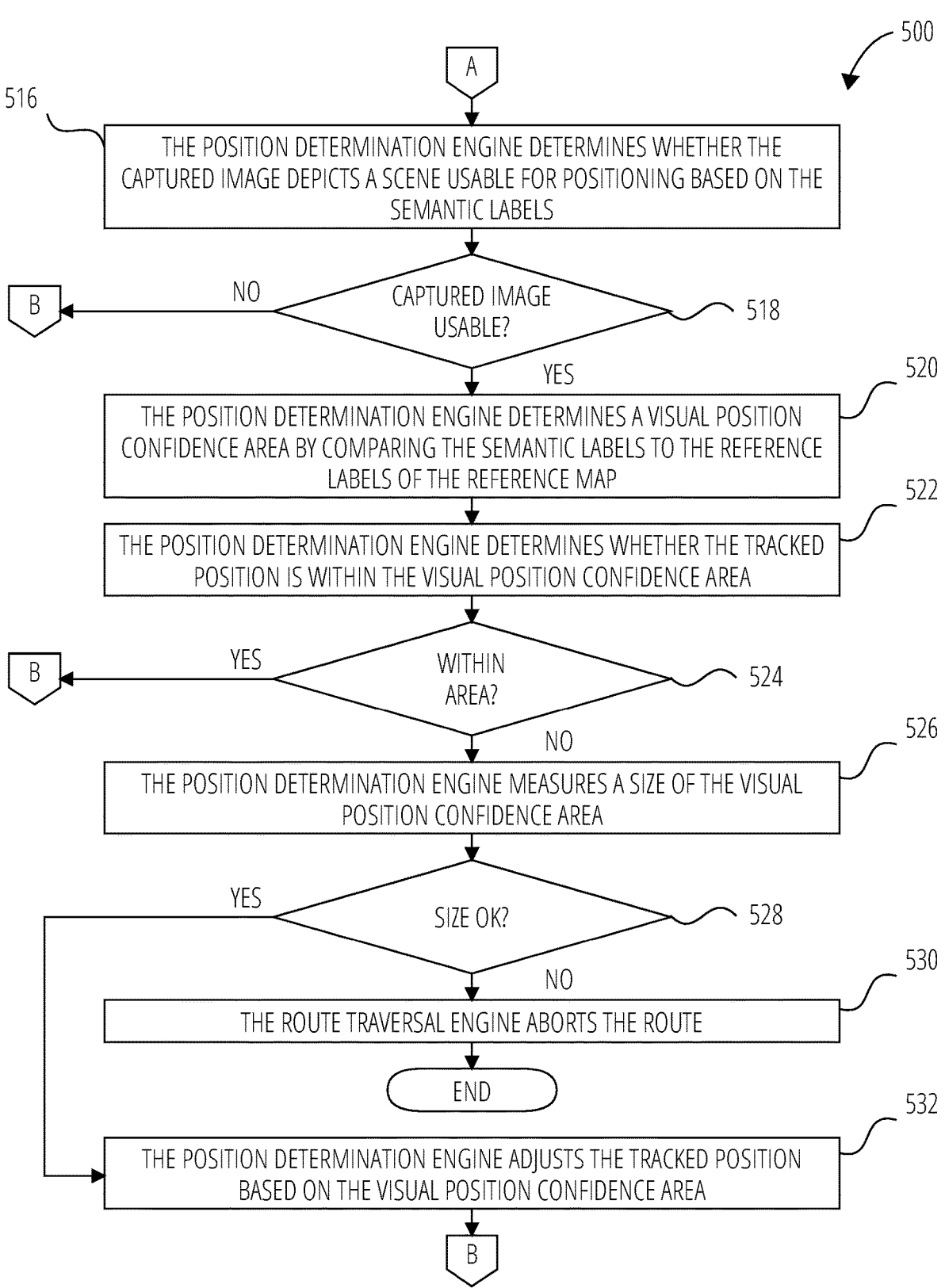

FIG. 5A-FIG. 5B are a flowchart that illustrates a non-limiting example embodiment of a method of correcting erroneous UAV positioning information using semantically segmented imagery according to various aspects of the present disclosure. In the method 500, a visual position is determined from a captured image, and is compared to a tracked position obtained via other positioning systems that is otherwise used for navigation. If the visual position and the tracked position agree, the tracked position is confirmed as reliable enough for further use. If the visual position and the tracked position disagree, and the visual position includes hallmarks of reliability, the tracked position is updated based on the visual position.

From a start block, the method 500 proceeds to block 502, where a route traversal engine 218 of a UAV 200 receives a route from a fleet management computing system. In some embodiments, the route may indicate a starting point (e.g., a location from which the UAV 200 will be launched). In some embodiments, the route may indicate an endpoint (e.g., a location at which the UAV 200 is intended to land). In some embodiments, the route may specify a precise starting point and/or endpoint, such as a particular landing space in a nest that has a known position. In some embodiments, the route may merely specify the identity of a nest, with a particular landing space to be dynamically assigned at a later point in time. In some embodiments, the route may indicate a destination (e.g., a delivery location) to which the UAV 200 is intended to autonomously navigate. In some embodiments, the route may include one or more waypoints through which the UAV 200 should travel while traversing the route. In some embodiments, the route may include a two-dimensional or three-dimensional corridor through which the UAV 200 is intended to travel.

At block 504, a position determination engine 216 of the UAV 200 retrieves a reference map associated with the route from the fleet management computing system, wherein the reference map includes reference labels, and at block 506, the position determination engine 216 stores the reference map in a reference map data store 214 of the UAV 200. In some embodiments, the UAV 200 may retrieve one or more reference maps that cover the entire route. In some embodiments, the UAV 200 may retrieve a reference map that covers a start point, a delivery location, an end point, or any other portion of the route instead of the entire route in order to conserve storage space within the reference map data store 214. In some embodiments, the reference labels are labels that semantically identify features visible in the reference map.

At block 508, the position determination engine 216 determines a tracked position using at least one positioning sensor. In some embodiments, the tracked position will be determined by a GNSS sensor (e.g., a GPS sensor) of the UAV 200. In some embodiments, the tracked position may be determined by another type of sensor of the UAV 200, including but not limited to sensors of an inertial positioning system, or sensors configured to determine positions based on terrestrial radio signals. In some embodiments, the tracked position may be determined using multiple different types of sensors using sensor fusion techniques. In some embodiments, the tracked position may be maintained over time using an extended Kalman filter and/or other techniques for updating a position value over time based on sensor information.

At block 510 a route traversal engine 218 of the UAV 200 transmits signals to one or more propulsion devices 210 of the UAV 200 to cause the UAV 200 to begin traversing the route. Often, beginning to traverse the route involves actuating one or more propulsion devices 210 to cause the UAV 200 to take off. In some embodiments, the route traversal engine 218 may initially cause the UAV 200 to ascend vertically over its initial location before travelling horizontally along the route, such that the UAV 200 may initially be over its departing nest. In some embodiments, the route traversal engine 218 may cause the UAV 200 to hover over its initial location while performing one or more pre-mission tests and/or configurations.

At block 512, the position determination engine 216 receives a captured image from a camera 220 of the UAV 200, and at block 514, the position determination engine 216 processes the captured image to determine semantic labels associated with the captured image. In some embodiments, the position determination engine 216 processes the captured image using one or more machine learning models that generate the semantic labels for the plurality of objects. In some embodiments, the position determination engine 216 may transmit the captured image to the fleet management computing system for processing by one or more machine learning models, and the results of the processing may be transmitted back to the position determination engine 216.

In some embodiments, the machine learning models may generate labels for individual pixels in the captured image, and the position determination engine 216 may use various morphological operations and/or heuristics to group the labeled pixels and generate semantic labels for objects. Typically, the semantic labels are generated for types of objects that have fixed locations in aerial imagery and are suitable for use as navigation landmarks, including but not limited to streets, buildings, landing spaces, telephone poles, light standards, sporting fields, and/or bodies of water.

The method 500 then proceeds to a continuation terminal ("terminal A"). From terminal A (FIG. 5B), the method 500 proceeds to block 516, where the position determination engine 216 determines whether the captured image depicts a scene usable for positioning based on the semantic labels. Some scenes, such as scenes that only include a single semantic label or a repeating pattern of similar semantic labels, may be easily determined to be of little use for positioning. For example, the UAV 200 may be over a forest, a field, or another geographic feature where the geographic feature takes up the entire field of view depicted in the captured image, such that there is no way to determine from the captured image where the UAV 200 is positioned with respect to the geographic feature, nor is there a way to disambiguate the geographic feature from other, similar geographic features (e.g., distinguishing one forest from another forest). By avoiding further processing of captured images that are likely to lead to poor results, computing resources can be conserved, and the method 500 can avoid generating unreliable outcomes.

The position determination engine 216 may use any suitable technique to determine whether the captured image depicts a scene usable for positioning based on the semantic labels. For example, in some embodiments, the position determination engine 216 may apply a heuristic to the semantic labels associated with the captured image.

One non-limiting example heuristic is a number of semantic labels associated with the captured image. In one such heuristic, the number of semantic labels may be compared to a threshold number of semantic labels. If fewer semantic labels are associated with the captured image than the threshold number of semantic labels, then the position determination engine 216 may determine that the scene is not usable for positioning. One example of this may be if only a single semantic label is present (e.g., the forest or other geographic feature filling the entire captured image as discussed above), though in other embodiments, higher thresholds may be used to make it more likely that the captured image is alignable to a single position in the reference map with a high level of confidence.

In another similar heuristic, a number of types of semantic labels may be compared to a threshold number of types of semantic labels. If fewer types of semantic labels are associated with the captured image than the threshold number of types of semantic labels, then the position determination engine 216 may determine that the scene is not usable for positioning. One example of this may be if only semantic labels for a road and a field have been associated with the captured image—the heuristic may determine that having only these two types of semantic labels associated with the captured image is unlikely to be uniquely alignable to the reference map because many positions are likely to have similar semantic labels, and so the captured image should be considered unusable for positioning.

In some embodiments, such a heuristic may include thresholds for separate types of semantic labels. For example, a number of semantic labels of a first type (e.g., forests) may be compared to a first threshold, while a number of semantic labels of a second type (e.g., houses) may be compared to a second threshold.

In some embodiments, the position determination engine 216 may use a technique other than a heuristic to determine whether the captured image depicts a scene usable for positioning. For example, in some embodiments, the position determination engine 216 may provide the captured image (and/or the semantic labels) to a machine learning model that has been trained to classify captured images as either usable for positioning or not usable for positioning. Such a machine learning model may be trained using any suitable technique, including but not limited to gradient descent or an Adam optimizer.

The machine learning model may be trained using training data that is collected using any suitable technique. For example, in some embodiments the machine learning model may be trained by collecting captured images and generating semantic labels, and then using the semantic labels to determine a position based on the reference map without first checking to see whether the captured image is usable for positioning. Captured images for which ambiguous positions are determined will have a low confidence level, and captured images for which precise positions are determined will have a high confidence level. The captured images may then be labeled as usable or not usable based on a confidence level threshold, and the machine learning model may be trained using this labeled training data.

As another example, in some embodiments, the position determination engine 216 may consult a portion of the reference map associated with the tracked position, and may perform the heuristic or machine learning steps described above with respect to the reference labels of the reference map associated with the tracked position. In such embodiments, the position determination engine 216 may use the reference map information to determine whether a usable captured image is expected to be captured, and if it is not expected to be captured, the position determination engine 216 may assume that the captured image is not usable. Further, in such embodiments the method 500 may skip capturing the captured image altogether in order to save further processing time and computer memory space involved with capturing the captured image.

The method 500 then proceeds to a decision block 518, where a decision is made based on the determination of whether the captured image is usable for positioning. If it had been determined that the captured image is not usable for positioning, then the result of decision block 518 is NO, and the method 500 returns to block 510 via a continuation terminal ("terminal B") to continue to use the tracked position using the positioning sensors without corrections based on the captured image, until a subsequent captured image is obtained.

Otherwise, if it had been determined that the captured image is usable for positioning, then the result of decision block 518 is YES, and the method 500 proceeds to block 520, where the position determination engine 216 determines a visual position confidence area by comparing the semantic labels to the reference labels of the reference map. In some embodiments, the position determination engine 216 may slide the semantic labels over the reference labels of the reference map to determine a correlation amount of the semantic labels and various positions of the reference map. In some embodiments, the position determination engine 216 may also scale the semantic labels based on an altitude of the UAV 200 so that sizes of the semantic labels match sizes of the reference labels in the reference map. The altitude may be determined using any suitable technique, including but not limited to a signal from an altimeter and/or a rangefinder aligned with the camera 220.

In some embodiments, the position determination engine 216 may use a cross-correlation or another suitable technique to slide the semantic labels over the reference labels of the reference map. Sliding the semantic labels over the reference labels may include comparing the semantic labels to reference labels at a plurality of relative positions between the semantic labels and the reference labels, and determining a correlation score at each position that is based on how well the semantic labels match the reference labels. The correlation score for each location reflects a level of confidence that the semantic labels match the reference labels for the location.

In some embodiments, the position determination engine 216 may consider locations with correlation scores over a threshold value to make up the visual position confidence area. For example, the position determination engine 216 may use a threshold value of 95% to designate the visual position confidence area. In other words, locations where the comparison between the semantic labels and the reference labels have a 95% match are considered to be within the visual position confidence area, while locations with less than a 95% match are considered to be outside the visual position confidence area. The threshold value of 95% is an example only, and in other embodiments, other thresholds (including but not limited to any threshold between 100% and 85%) may be used.

One will note that, if the pattern of semantic labels is unique and closely matches the size, shape, and orientation of the reference labels, the correlation scores may have a well-defined peak with a high value (e.g., a high correlation score/confidence value), and the visual position confidence area will be smaller. It follows that if the pattern of semantic labels is not unique, the correlation scores may have a less well-defined peak, and the visual position confidence area will be larger. Likewise, if the semantic labels have a slightly different size, shape, and/or orientation compared to the reference labels, the correlation scores may be lower. If the correlation scores fail to reach the threshold value, the visual position confidence area may be of zero size.

If the tracked position is within the visual position confidence area, then the visual position (the position determined by comparing the captured image to the reference map) and the tracked position agree, and it is an indication that the tracked position may be reliably used for navigation. Accordingly, at block 522, the position determination engine 216 determines whether the tracked position is within the visual position confidence area.

The method 500 then proceeds to a decision block 524, where a decision is made based on the determination of whether the tracked position is within the visual position confidence area. If it had been determined that the tracked position is within the visual position confidence area, then the result of decision block 524 is YES, and the method 500 returns to block 510 via terminal B to continue to use the tracked position (which has now been confirmed as accurate by virtue of its agreement with the visual position) without correction, until a subsequent captured image is obtained.

Otherwise, if it had been determined that the tracked position is not within the visual position confidence area, then the result of decision block 524 is NO, and the method 500 proceeds to block 526. If there is disagreement between the tracked position and the visual position, then the visual position can be used to adjust the tracked position. However, in some embodiments, the visual position may first be checked for hallmarks of reliability in order to avoid adjusting the tracked position based on a visual position that is not itself reliable.

Accordingly, at block 526, the position determination engine 216 measures a size of the visual position confidence area. Any suitable size may be used, including but not limited to an area of the visual position confidence area; a maximum width, height, or other distance across the visual position confidence area; or any other measurement of size. The size of the visual position confidence area is an indicator of reliability of the visual position. If the visual position confidence area has a size larger than a threshold size, it may indicate that the visual position did not uniquely match any location, and so it cannot reliably be used for correcting the tracked position.

In some embodiments, a minimum threshold size may be specified as well. If the visual position confidence area has a size smaller than a minimum threshold size (which may be quite small), it may indicate that no locations with a correlation score greater than the confidence threshold were found, or it may indicate an anomaly with the data-even a 100% match at a given location would be expected to have relatively high correlation scores in a small area around it. If the visual position confidence area is smaller than the minimum threshold size, then the method 500 may behave as if the captured image was unusable, and may return to block 510 to capture another image without taking further action with respect to the tracked position.

After measuring the size of the visual position confidence area, the method 500 proceeds to decision block 528, where a determination is made based on the measured size of the visual position confidence area. If the size of the visual position confidence area is less than the threshold size that indicates the visual position confidence area is too large to indicate a unique location match, then the result of decision block 528 is YES, and the method 500 proceeds to block 532. At block 532, the position determination engine 216 adjusts the tracked position based on the visual position confidence area. The method 500 then returns to block 510 via terminal B to use the corrected tracked position until a subsequent captured image is obtained.

The position determination engine 216 may use any suitable technique to adjust the tracked position. In some embodiments, the position determination engine 216 may reset the tracked position to a centroid or a weighted centroid of the visual position confidence area. In some embodiments, the position determination engine 216 may reset the tracked position to a nearest point on a boundary of the visual position confidence area. In some embodiments, instead of resetting the tracked position, the position determination engine 216 may "nudge" the tracked position based on the visual position confidence area. For example, the position determination engine 216 may provide an input to an extended Kalman filter (EKF) used to update the tracked position that biases future tracked positions based on the visual position confidence area.

Returning to decision block 528, if the size of the visual position confidence area is not less than the threshold size, then the result of decision block 528 is NO, and the method 500 proceeds to block 530. At this point, the visual position confidence area is too large to specify a precise visual position with sufficient confidence, but the tracked position is nevertheless outside of this large area. As such, it is likely that the tracked position is grossly inaccurate, and should not be used for further navigation. Accordingly, at block 530, the route traversal engine 218 aborts the route. The route traversal engine 218 may use any suitable technique to abort the route. In some embodiments, the route traversal engine 218 may transmit signals to the propulsion devices 210 to cause the UAV 200 to land, either immediately at the current position, or after identifying a safe location nearby at which to land. In some embodiments, the route traversal engine 218 may transmit signals to the propulsion devices 210 to cause the UAV 200 to backtrack along the route, to change altitude, or to hover until a confident position can be determined, at which point the route may be rejoined or the UAV 200 may return to a landing location.

The method 500 then proceeds to an end block and terminates.

As described above, the method 500 returns to block 510 at several points in order to process a subsequent captured image. In some embodiments, captured images may be processed as quickly as the camera 220 captures them (i.e., at the framerate of a video captured by the camera 220). In some embodiments, captured images may be processed at a slower rate. For example, after returning to block 510, the method 500 may wait for a predetermined amount of time before proceeding to perform the actions of block 510, such that there is a delay between subsequent checks of the tracked position in order to avoid wasting computing resources. Any suitable predetermined amount of time may be used, including but not limited to one second, ten seconds, one minute, five minutes, or any other predetermined amount of time. In some embodiments, instead of waiting for a predetermined amount of time, the method 500 may wait for the UAV 200 to travel a predetermined distance before proceeding to perform the actions of block 510, any suitable predetermined distance may be used, including but not limited to ten meters, 100 meters, 500 meters, 1000 meters, or any other predetermined distance. In some embodiments, the wait time or distance may be adjustable.

Figure 6A:
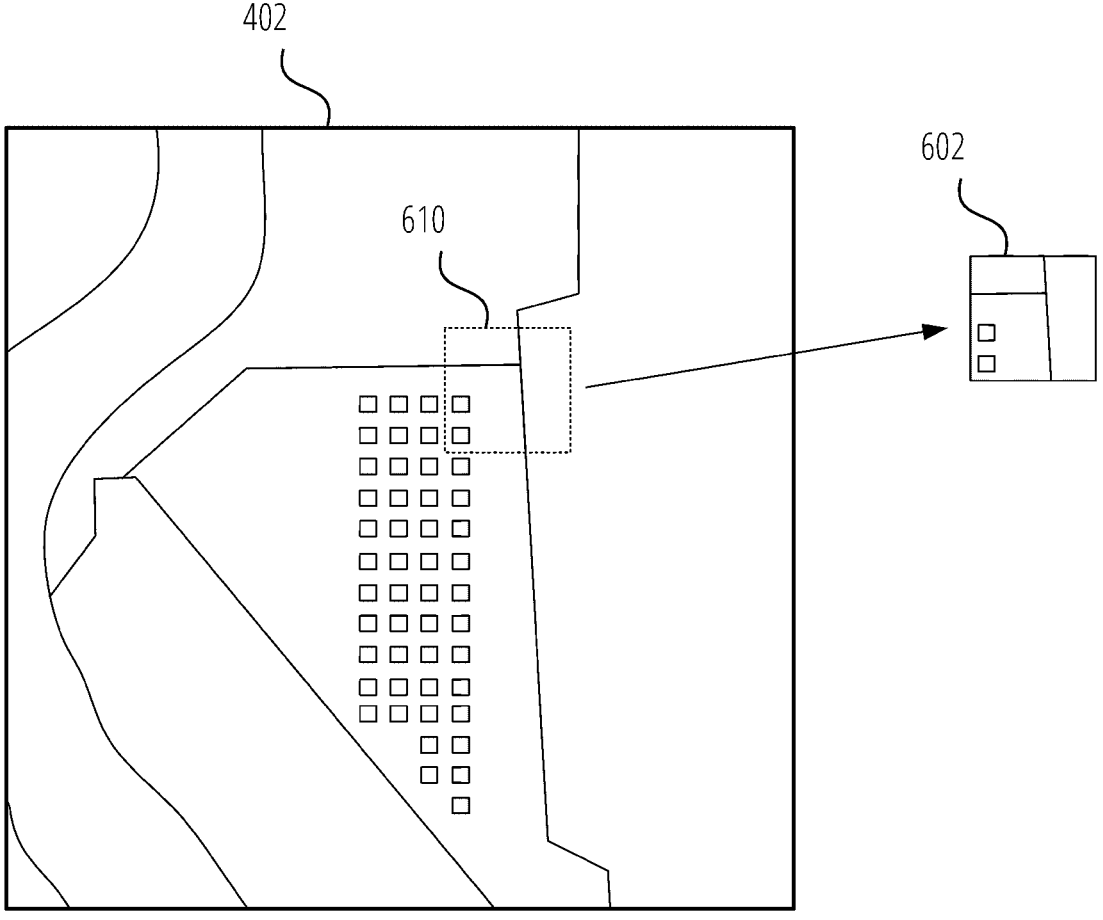
FIG. 6A and FIG. 6B illustrate the processing of a captured image with a usable visual position according to various aspects of the present disclosure.
Figure 6B:
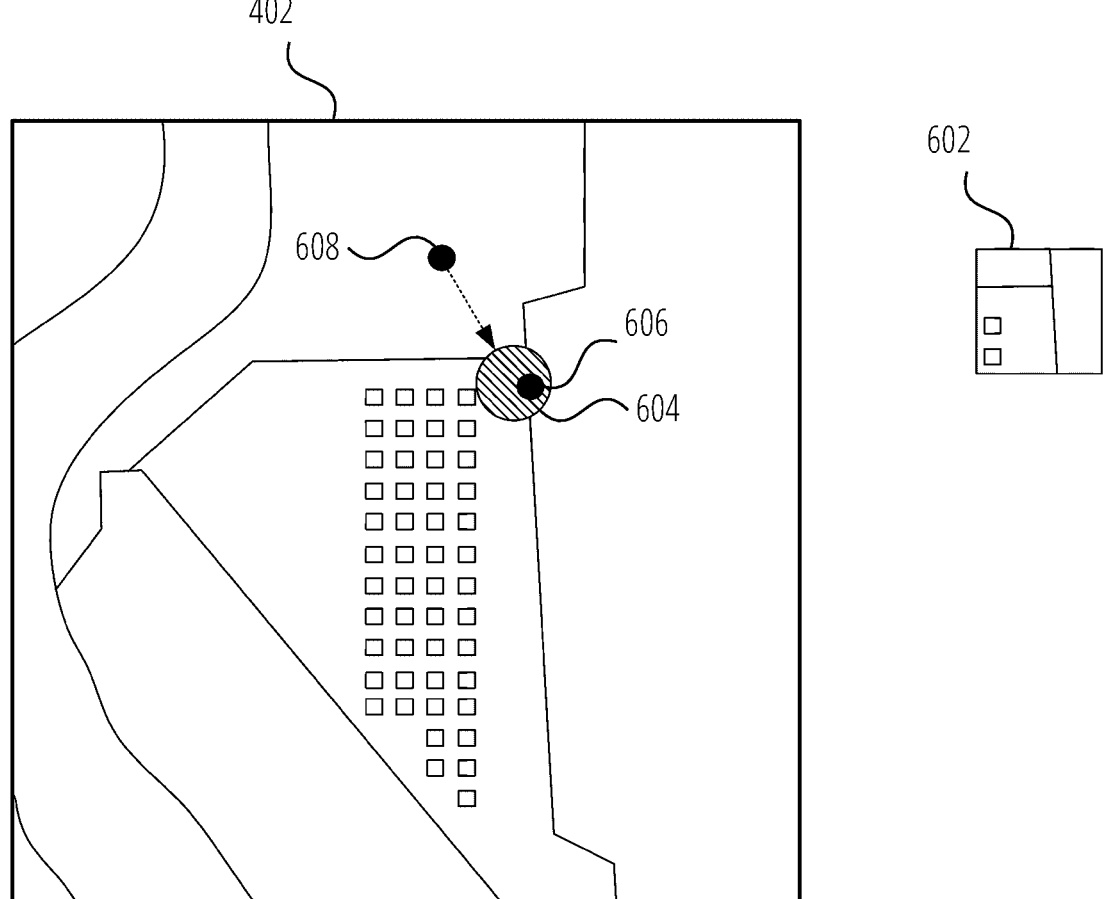

To help illustrate the method 500, what follows are several illustrations of the processing performed by the UAV 200 during the method 500 in order to validate and/or address issues with the tracked position using a visual position. FIG. 6A and FIG. 6B illustrate the processing of a captured image with a usable visual position according to various aspects of the present disclosure. The reference map 402 illustrated in FIG. 6A and FIG. 6B is similar to the reference map 402 illustrated in FIG. 4, though the reference labels have not been numbered in FIG. 6A or FIG. 6B to avoid obscuring other aspects of the disclosure.

In FIG. 6A, the UAV 200 is located at a position such that the downward-facing camera 220 of the UAV 200 has a field of view 610 as indicated by the dashed square. Typically, this would mean that the UAV 200 is positioned at or near the center of the dashed square. Accordingly, the camera 220 collects a captured image 602 of the field of view 610, which is then processed as the captured image collected at block 512 of the method 500.

FIG. 6B illustrates potential results of the processing of the captured image 602 by the method 500. It is assumed that the captured image 602 had been determined at block 516 to have been usable for positioning, and the result of decision block 518 was YES. Accordingly, at block 520, the position determination engine 216 determined a visual position confidence area, which is illustrated as visual position confidence area 604. Because the pattern of semantic labels associated with the captured image 602 is only present in a single position in the reference map 402, the visual position confidence area 604—the area within which the semantic labels of the captured image 602 align to the reference labels of the reference map 402 with more than a threshold confidence-covers a relatively small area.

FIG. 6B illustrates two potential tracked positions to illustrate how the different tracked positions would be processed. A first tracked position, tracked position 606, is within the visual position confidence area 604. In other words, the tracked position 606 agrees with the visual position determined based on the captured image 602. For this tracked position 606, the result of decision block 524 would be YES, and no changes would be made to the tracked position 606.

A second tracked position, tracked position 608, is outside of the visual position confidence area 604, indicating disagreement between the visual position and the tracked position 608. At block 526, the size of the visual position confidence area 604 is measured, and because the size is below a threshold size, the result of decision block 528 is YES. At block 532, the tracked position 608 is adjusted based on the visual position confidence area 604, such as being placed at the centroid of the visual position confidence area 604, being placed at the closest edge of the visual position confidence area 604, biased to move toward the visual position confidence area 604, or in any other way, as illustrated by the dotted arrow.

Figure 7A:
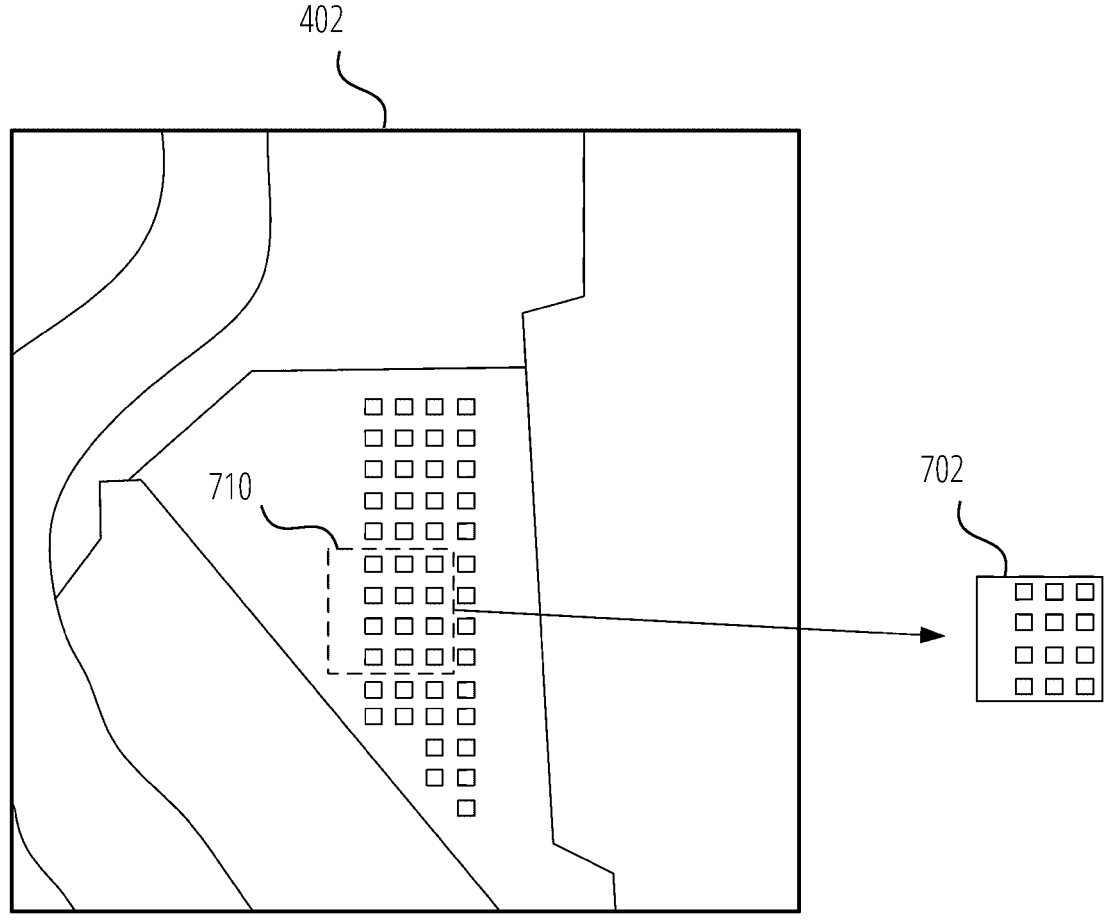
FIG. 7A and FIG. 7B illustrate the processing of a captured image with an unusable visual position according to various aspects of the present disclosure.
Figure 7B:
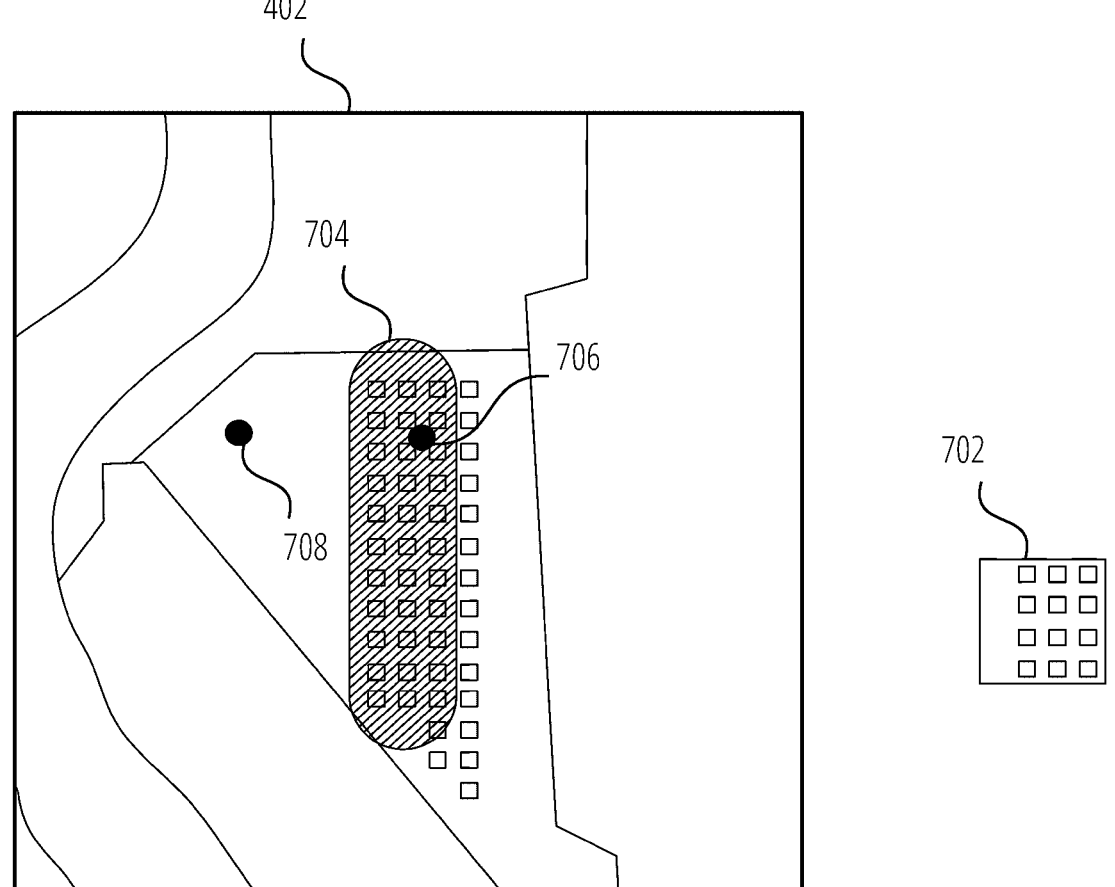

FIG. 7A and FIG. 7B illustrate the processing of a captured image with an unusable visual position according to various aspects of the present disclosure. The reference map 402 illustrated in FIG. 7A and FIG. 7B is again similar to the reference map 402 illustrated in FIG. 4, though the reference labels have not been numbered in FIG. 7A or FIG. 7B to avoid obscuring other aspects of the disclosure.

In FIG. 7A, the UAV 200 is located at a position such that the downward-facing camera 220 of the UAV 200 has a field of view 710 as indicated by the dashed square. Typically, this would mean that the UAV 200 is positioned at or near the center of the dashed square. Accordingly, the camera 220 collects a captured image 702 of the field of view 710, which is then processed as the captured image collected at block 512 of the method 500.

FIG. 7B illustrates potential results of the processing of the captured image 702 by the method 500. It is assumed that the captured image 702 had been determined at block 516 to have been usable for positioning, and the result of decision block 518 was YES. Accordingly, at block 520, the position determination engine 216 determined a visual position confidence area, which is illustrated as visual position confidence area 704. Unlike the captured image 602, the pattern of semantic labels associated with the captured image 702 is present in multiple locations in the reference map 402 due to the repeating pattern of the plurality of landing spaces 410. Hence, the visual position confidence area 704 covers a relatively large area because the semantic labels of the captured image 702 could match in multiple positions within the reference labels.

FIG. 7B illustrates two potential tracked positions to illustrate how the different tracked positions would be processed. A first tracked position, tracked position 706, is within the visual position confidence area 704. In other words, despite the visual position confidence area 704 being large, the tracked position 706 agrees with a possible visual position according to the captured image 702, and so is likely to be usable for navigation. For this tracked position 706, the result of decision block 524 would be YES, and no changes would be made to the tracked position 706.

A second tracked position, tracked position 708, is outside of the visual position confidence area 704, indicating disagreement between the visual position and the tracked position 708. At block 526, the size of the visual position confidence area 704 is measured. Because the size is not below the threshold size, the result of decision block 528 is NO. In other words, it has been determined that the tracked position 708 is not reliable because it does not agree with the visual position, and the visual position confidence area 704 is not precise enough to be used for correction. Accordingly, at block 530, the route traversal engine 218 causes the route to be aborted, such as by causing the UAV 200 to land, or by taking other corrective action.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of an unmanned aerial vehicle (UAV), causes the UAV to perform actions comprising:
   determining, by the UAV, a tracked position using at least one positioning sensor of the UAV;
   capturing, by the UAV, an image using a camera of the UAV;
   processing, by the UAV, the captured image to apply semantic labels to the captured image;
   determining, by the UAV, whether the captured image depicts a scene usable for positioning based on the semantic labels; and in response to determining that the captured image depicts a scene usable for positioning:
   determining, by the UAV, a visual position confidence area using the captured image, wherein determining the visual position confidence area includes:
      determining correlation scores between the semantic labels applied to the image and reference labels of a reference map; and
      assigning locations depicted in the reference map having correlation scores greater than a threshold value to be within the visual position confidence area;
   checking, by the UAV, the tracked position using the visual position confidence area to determine whether the tracked position is accurate; and
   in response to determining that the tracked position is not accurate, causing, by the UAV, a corrective action based on the visual position confidence area;
   wherein determining whether the captured image depicts a scene usable for positioning includes at least one of:
      counting the semantic labels applied to the captured image to determine a number of semantic labels and comparing the number of semantic labels to a threshold number of semantic labels; or
      counting types of the semantic labels applied to the captured image to determine a number of semantic label types and comparing the number of semantic label types to a threshold number of semantic label types.

2. The non-transitory computer-readable medium of claim 1, wherein checking the tracked position using the visual position confidence area to determine whether the tracked position is accurate includes:
   determining whether the tracked position is within the visual position confidence area.

3. The non-transitory computer-readable medium of claim 2, wherein causing the corrective action based on the visual position confidence area includes:
   in response to determining that a size of the visual position confidence area is less than a threshold size, setting the tracked position based on the visual position confidence area.

4. The non-transitory computer-readable medium of claim 2, wherein causing a corrective action based on the visual position confidence area includes:
   in response to determining that a size of the visual position confidence area is not less than a threshold size, aborting a route being traveled by the UAV.

5. The non-transitory computer-readable medium of claim 4, wherein aborting the route being traveled by the UAV includes causing the UAV to land.

6. The non-transitory computer-readable medium of claim 1, wherein determining the tracked position using the at least one positioning sensor of the UAV includes using an extended Kalman filter (EKF) to process signals from the at least one positioning sensor.

7. A method for autonomous navigation of an unmanned aerial vehicle (UAV), the method comprising:
   determining, by the UAV, a tracked position using at least one positioning sensor of the UAV;
   capturing, by the UAV, an image using a camera of the UAV;
   processing, by the UAV, the captured image to apply semantic labels to the captured image;
   determining, by the UAV, whether the captured image depicts a scene usable for positioning based on the semantic labels; and in response to determining that the captured image depicts a scene usable for positioning:

determining, by the UAV, a visual position confidence area using the captured image, wherein determining the visual position confidence area includes:

determining correlation scores between the semantic labels applied to the image and reference labels of a reference map; and assigning locations depicted in the reference map having correlation scores greater than a threshold value to be within the visual position confidence area;

checking, by the UAV, the tracked position using the visual position confidence area to determine whether the tracked position is accurate; and in response to determining that the tracked position is not accurate, causing, by the UAV, a corrective action based on the visual position confidence area;

wherein determining whether the captured image depicts a scene usable for positioning includes at least one of:

counting the semantic labels applied to the captured image to determine a number of semantic labels and comparing the number of semantic labels to a threshold number of semantic labels; or counting types of the semantic labels applied to the captured image to determine a number of semantic label types and comparing the number of semantic label types to a threshold number of semantic label types.

8. The method of claim 7, wherein checking the tracked position using the visual position confidence area to determine whether the tracked position is accurate includes:

determining whether the tracked position is within the visual position confidence area.

9. The method of claim 8, wherein causing the corrective action based on the visual position confidence area includes:

in response to determining that a size of the visual position confidence area is less than a threshold size, setting the tracked position based on the visual position confidence area.

10. The method of claim 8, wherein causing a corrective action based on the visual position confidence area includes:

in response to determining that a size of the visual position confidence area is not less than a threshold size, aborting a route being traveled by the UAV.

11. The method of claim 10, wherein aborting the route being traveled by the UAV includes causing the UAV to land.

12. The method of claim 7, wherein determining the tracked position using the at least one positioning sensor of the UAV includes using an extended Kalman filter (EKF) to process signals from the at least one positioning sensor.

* * * * *